(12) United States Patent
Bennett et al.

(10) Patent No.: US 10,412,987 B2
(45) Date of Patent: Sep. 17, 2019

(54) HIGH-PROTEIN FOOD ADDITIVES

(71) Applicant: Twin Cups, LLC, Santa Barbara, CA (US)

(72) Inventors: Craig Bennett, Draper, UT (US); Nathan Carey, Santa Barbara, CA (US); Jacob Israelachvili, Santa Barbara, CA (US)

(73) Assignee: Twin Cups, LLC, Santa Barbara, CA (US)

( * ) Notice: Subject to any disclaimer, the term of this patent is extended or adjusted under 35 U.S.C. 154(b) by 273 days.

(21) Appl. No.: 15/220,238

(22) Filed: Jul. 26, 2016

(65) Prior Publication Data

US 2017/0035090 A1 Feb. 9, 2017

Related U.S. Application Data

(62) Division of application No. 14/986,208, filed on Dec. 31, 2015, now Pat. No. 9,675,100.

(60) Provisional application No. 62/201,701, filed on Aug. 6, 2015.

(51) Int. Cl.

| | | |
|---|---|---|
| *A23L 33/185* | (2016.01) | |
| *A23L 33/19* | (2016.01) | |
| *A23L 2/66* | (2006.01) | |
| *A23L 3/36* | (2006.01) | |
| *A23L 27/30* | (2016.01) | |
| *A23L 33/21* | (2016.01) | |
| *A23G 9/52* | (2006.01) | |

(52) U.S. Cl.
CPC ............... *A23L 33/19* (2016.08); *A23G 9/52* (2013.01); *A23L 2/66* (2013.01); *A23L 3/36* (2013.01); *A23L 27/36* (2016.08); *A23L 33/185* (2016.08); *A23L 33/21* (2016.08); *A23V 2002/00* (2013.01)

(58) Field of Classification Search
CPC ........ A23L 33/19; A23L 33/21; A23L 33/185; A23L 27/36; A23L 2/66; A23L 3/36; A23G 9/52; A23V 2002/00
USPC ... 426/72, 74, 106, 112, 232, 392, 443, 580, 426/588, 656, 657, 658
See application file for complete search history.

(56) References Cited

U.S. PATENT DOCUMENTS

| | | | |
|---|---|---|---|
| 6,468,764 | B1 | 10/2002 | Gibbs et al. |
| 7,452,506 | B2 | 11/2008 | Gibbs et al. |
| 9,040,107 | B2 | 5/2015 | Bennett et al. |
| 9,167,826 | B1 | 10/2015 | Bennett et al. |

*Primary Examiner* — Leslie A Wong
(74) *Attorney, Agent, or Firm* — SoCal IP Law Group LLP; Guy Cumberbatch; Steven C. Sereboff

(57) ABSTRACT

Both dairy and non-dairy based high protein ingredient systems that are available in either a liquid or dry powder blend. These ingredient system options have been balanced to provide a rich and creamy mouthfeel which can be easily added into a wide array of products to enhance their protein and nutritional levels without creating the sandy or gritty texture that typically forms. The liquid version has already been pasteurized or asceptically packaged for easy incorporation into other liquid products such as smoothies, yogurts, puddings, jells, toppings, fillings, carbonated or still beverages such as juices of milks, ice cream mixes, frozen yogurts and frozen desserts. The powdered version is designed to be easily blended into other dry mixes, batters, baked goods, cereals, dressings, hummus products, breads, and dry dessert mixes, while liquid additive versions may be added to water, milk products such as liquid milk and yogurt, etc.

8 Claims, 15 Drawing Sheets

Liquid UHT Pasteurized Dairy Protein System

Mix Formula  
Serving Size: 137.5 g's/4 fl. oz., delivers 20.6 3g's of protein  
Batch Size: 970

| Order | Ingredients | Raw Ingred. Info % Fat | % Protein | % T.S. | Formula Info % By Wt. | LB's/Batch | Base Mix Info % Fat | % Protein | % T.S. | Gallons |
|---|---|---|---|---|---|---|---|---|---|---|
| 1 | Water | 0.00 | 0.00 | 0.00 | 59.182 | 574.07 | 0.000 | 0.000 | 0.000 | 68.75 |
| 5 | Heavy Cream | 41.5 | 2.6 | 46.2 | 1.500 | 14.55 | 0.623 | 0.039 | 0.693 | 1.79 |
| 2 | Cane Sugar | 0.00 | 0.00 | 99.80 | 4.500 | 43.65 | 0.000 | 0.000 | 4.491 | |
| 2 | Dextrose, Granulated | 0.00 | 0.00 | 99.00 | 2.000 | 19.40 | 0.000 | 0.000 | 1.980 | |
| 2 | Trisodium Citrate | 0.00 | 0.00 | 98.00 | 0.100 | 0.97 | 0.000 | 0.000 | 0.098 | |
| 2 | Deoiled Sunflower Lecithin | 80.00 | 1.00 | 95.00 | 0.100 | 0.97 | 0.080 | 0.001 | 0.095 | |
| 2 | Sodium Tri-polyphosphate | 0.00 | 0.00 | 98.00 | 0.200 | 1.94 | 0.000 | 0.000 | 0.196 | |
| 2 | Sodium Hexametaphosphate | 0.00 | 0.00 | 98.00 | 0.100 | 0.97 | 0.000 | 0.000 | 0.098 | |
| 2 | Inulin | 0.00 | 0.00 | 90.00 | 4.000 | 38.80 | 0.000 | 0.000 | 3.600 | |
| 2 | Stevia Extract, 97% Reb A | 0.00 | 0.00 | 97.00 | 0.018 | 0.17 | 0.000 | 0.000 | 0.017 | |
| 6 | Skim Milk Powder | 0.65 | 36.00 | 96.00 | 3.500 | 33.95 | 0.023 | 1.260 | 3.360 | |
| 2 | Xylitol | 0.00 | 0.00 | 98.00 | 7.750 | 75.18 | 0.000 | 0.000 | 7.595 | |
| 4 | Whey Protein Isolate | 0.3 | 94.00 | 95.30 | 0.500 | 4.85 | 0.002 | 0.470 | 0.477 | |
| 3 | Whey Protein Concentrate | 7.00 | 80.00 | 95.50 | 16.550 | 160.54 | 1.159 | 13.240 | 15.805 | |
| | Totals: | | | | 100.000 | 970.00 | 1.885 | 15.010 | 38.505 | 100.00 |

(c) 2015 Twin Cups, LLC

Figure 2A

Liquid HTST Pasteurized Dairy Protein System

Mix Formula — Serving Size: 139.9 g's/4 fl. oz., delivers 27.28 g's of protein Batch Size: 987

| Order | Ingredients | Raw Ingred. Info % Fat | Raw Ingred. Info % Protein | Raw Ingred. Info % T.S. | Formula Info % By Wt. | Formula Info LB's/Batch | Base Mix Info % Fat | Base Mix Info % Protein | Base Mix Info % T.S. | Gallons |
|---|---|---|---|---|---|---|---|---|---|---|
| 1 | Water | 0.00 | 0.00 | 0.00 | 56.072 | 553.43 | 0.000 | 0.000 | 0.000 | 66.28 |
| 5 | Heavy Cream | 41.5 | 2.6 | 46.2 | 0.500 | 4.94 | 0.208 | 0.013 | 0.231 | 0.61 |
| 2 | Cane Sugar | 0.00 | 0.00 | 99.80 | 4.500 | 44.42 | 0.000 | 0.000 | 4.491 | |
| 2 | Dextrose, Granulated | 0.00 | 0.00 | 99.00 | 2.000 | 19.74 | 0.000 | 0.000 | 1.980 | |
| 2 | Trisodium Citrate | 0.00 | 0.00 | 98.00 | 0.100 | 0.99 | 0.000 | 0.000 | 0.098 | |
| 2 | Deoiled Sunflower Lecithin | 80.00 | 1.00 | 95.00 | 0.100 | 0.99 | 0.080 | 0.001 | 0.095 | |
| 2 | Sodium Tri-polyphosphate | 0.00 | 0.00 | 98.00 | 0.200 | 1.97 | 0.000 | 0.000 | 0.196 | |
| 2 | Sodium Hexametaphosphate | 0.00 | 0.00 | 98.00 | 0.100 | 0.99 | 0.000 | 0.000 | 0.098 | |
| 2 | Inulin | 0.00 | 0.00 | 90.00 | 3.200 | 31.58 | 0.000 | 0.000 | 2.880 | |
| 2 | Stevia Extract, 97% Reb A | 0.00 | 0.00 | 97.00 | 0.018 | 0.18 | 0.000 | 0.000 | 0.017 | |
| 6 | Skim Milk Powder | 0.65 | 36.00 | 96.00 | 2.160 | 21.32 | 0.014 | 0.778 | 2.074 | |
| 2 | Xylitol | 0.00 | 0.00 | 98.00 | 7.750 | 76.49 | 0.000 | 0.000 | 7.595 | |
| 4 | Whey Protein Isolate | 0.3 | 94.00 | 95.30 | 0.500 | 4.94 | 0.002 | 0.470 | 0.477 | |
| 3 | Whey Protein Concentrate | 7.00 | 80.00 | 95.50 | 22.800 | 225.04 | 1.596 | 18.240 | 21.774 | |
| | Totals: | | | | 100.000 | 987.00 | 1.899 | 19.502 | 42.006 | 100.00 |

Figure 2B

Liquid Vat Pasteurized Dairy Protein System

Mix Formula

Serving Size: 140.6 g's/4 fl. oz., delivers 29.87 g's of protein

Batch Size: 992

| | | Raw Ingred. Info | | | Formula Info | | | Base Mix Info | | | |
|---|---|---|---|---|---|---|---|---|---|---|---|
| Order | Ingredients | % Fat | % Protein | % T.S. | % By Wt. | LB's/Batch | % Fat | % Protein | % T.S. | Gallons |
| 1 | Water | 0.00 | 0.00 | 0.00 | 54.792 | 543.54 | 0.000 | 0.000 | 0.000 | 65.09 |
| 5 | Heavy Cream | 41.5 | 2.6 | 46.2 | 0.000 | 0.00 | 0.000 | 0.000 | 0.000 | 0.00 |
| 2 | Cane Sugar | 0.00 | 0.00 | 99.80 | 4.500 | 44.64 | 0.000 | 0.000 | 4.491 | |
| 2 | Dextrose, Granulated | 0.00 | 0.00 | 99.00 | 2.000 | 19.84 | 0.000 | 0.000 | 1.980 | |
| 2 | Trisodium Citrate | 0.00 | 0.00 | 98.00 | 0.100 | 0.99 | 0.000 | 0.000 | 0.098 | |
| 2 | Deoiled Sunflower Lecithin | 80.00 | 1.00 | 95.00 | 0.100 | 0.99 | 0.080 | 0.001 | 0.095 | |
| 2 | Sodium Tri-polyphosphate | 0.00 | 0.00 | 98.00 | 0.200 | 1.98 | 0.000 | 0.000 | 0.196 | |
| 2 | Sodium Hexametaphosphate | 0.00 | 0.00 | 98.00 | 0.100 | 0.99 | 0.000 | 0.000 | 0.098 | |
| 2 | Inulin | 0.00 | 0.00 | 90.00 | 2.780 | 27.58 | 0.000 | 0.000 | 2.502 | |
| 2 | Stevia Extract, 97% Reb A | 0.00 | 0.00 | 97.00 | 0.018 | 0.18 | 0.000 | 0.000 | 0.017 | |
| 6 | Skim Milk Powder | 0.65 | 36.00 | 96.00 | 2.160 | 21.43 | 0.014 | 0.778 | 2.074 | |
| 2 | Xylitol | 0.00 | 0.00 | 98.00 | 7.750 | 76.88 | 0.000 | 0.000 | 7.595 | |
| 4 | Whey Protein Isolate | 0.3 | 94.00 | 95.30 | 0.500 | 4.96 | 0.002 | 0.470 | 0.477 | |
| 3 | Whey Protein Concentrate | 7.00 | 80.00 | 95.50 | 25.000 | 248.00 | 1.750 | 20.000 | 23.875 | |
| | Totals: | | | | 100.000 | 992.00 | 1.846 | 21.249 | 43.498 | 100.00 |

(c) 2015 Twin Cups, LLC

Figure 2C

Liquid UHT Pasteurized Non-Dairy Protein System

Base Sorbet Mix Formula  Serving Size: 4 fl. oz./136g's delivers 12.24g's of protein  Batch Size: 500

| | | Raw Ingred. Info | | | Formula Info | | Base Mix Info | | | | |
|---|---|---|---|---|---|---|---|---|---|---|---|
| Order | Ingredients | % Fat | % Protein | % T.S. | % By Wt. | LB's/Batch | % Fat | % Protein | % T.S. | Gallons | % Sugar |
| 1 | Water | 0.00 | 0.00 | 0.00 | 63.730 | 318.65 | 0.000 | 0.000 | 0.000 | 38.16 | |
| 2 | Cane Sugar | 0.00 | 0.00 | 99.80 | 6.500 | 32.50 | 0.000 | 0.000 | 6.487 | | 6.44 |
| 2 | Xylitol | 0.00 | 0.00 | 99.00 | 14.000 | 70.00 | 0.000 | 0.000 | 13.860 | | |
| 2 | Trisodium Citrate | 0.00 | 0.00 | 98.00 | 0.100 | 0.50 | 0.000 | 0.000 | 0.098 | | |
| 2 | Deoiled Sunflower Lecithin | 80.00 | 1.00 | 95.00 | 0.100 | 0.50 | 0.080 | 0.001 | 0.095 | | |
| 2 | Sodium Tri-polyphosphate | 0.00 | 0.00 | 98.00 | 0.200 | 1.00 | 0.000 | 0.000 | 0.196 | | |
| 2 | Sodium Hexametaphosphate | 0.00 | 0.00 | 98.00 | 0.100 | 0.50 | 0.000 | 0.000 | 0.098 | | |
| 2 | Inulin | 0.00 | 0.00 | 90.00 | 4.000 | 20.00 | 0.000 | 0.000 | 3.600 | | 0.48 |
| 2 | Stevia Extract, 95% Reb A | 0.00 | 0.00 | 97.00 | 0.020 | 0.10 | 0.000 | 0.000 | 0.019 | | |
| 3 | Pea Protein | 0.50 | 80.00 | 94.50 | 11.250 | 56.25 | 0.056 | 9.000 | 10.631 | | 1.10 |
| | Totals: | | | | 100.000 | 500.00 | 0.136 | 9.001 | 35.085 | | 8.02 |

Figure 3A (c) 2015 Twin Cups, LLC

Liquid HTST Pasteurized Non-Dairy Protein System

Base Sorbet Mix Formula  Serving Size: 4 fl. oz./136.8g's delivers 13.68g's of protein   Batch Size: 500

| Order | Ingredients | Raw Ingred. Info % Fat | Raw Ingred. Info % Protein | Raw Ingred. Info % T.S. | Formula Info % By Wt. | Formula Info LB's/Batch | Base Mix Info % Fat | Base Mix Info % Protein | Base Mix Info % T.S. | Gallons | % Sugar |
|---|---|---|---|---|---|---|---|---|---|---|---|
| 1 | Water | 0.00 | 0.00 | 0.00 | 62.480 | 312.40 | 0.000 | 0.000 | 0.000 | 37.41 | |
| 2 | Cane Sugar | 0.00 | 0.00 | 99.80 | 6.500 | 32.50 | 0.000 | 0.000 | 6.487 | | 6.44 |
| 2 | Xylitol | 0.00 | 0.00 | 99.00 | 14.000 | 70.00 | 0.000 | 0.000 | 13.860 | | |
| 2 | Trisodium Citrate | 0.00 | 0.00 | 98.00 | 0.100 | 0.50 | 0.000 | 0.000 | 0.098 | | |
| 2 | Deoiled Sunflower Lecithin | 80.00 | 1.00 | 95.00 | 0.100 | 0.50 | 0.080 | 0.001 | 0.095 | | |
| 2 | Sodium Tri-polyphosphate | 0.00 | 0.00 | 98.00 | 0.200 | 1.00 | 0.000 | 0.000 | 0.196 | | |
| 2 | Sodium Hexametaphosphate | 0.00 | 0.00 | 98.00 | 0.100 | 0.50 | 0.000 | 0.000 | 0.098 | | |
| 2 | Inulin | 0.00 | 0.00 | 90.00 | 4.000 | 20.00 | 0.000 | 0.000 | 3.600 | | 0.48 |
| 2 | Stevia Extract, 95% Reb A | 0.00 | 0.00 | 97.00 | 0.020 | 0.10 | 0.000 | 0.000 | 0.019 | | |
| 3 | Pea Protein | 0.50 | 80.00 | 94.50 | 12.500 | 62.50 | 0.063 | 10.000 | 11.813 | | 1.23 |
| | Totals: | | | | 100.000 | 500.00 | 0.143 | 10.001 | 36.266 | | 8.14 |

Figure 3B (c) 2015 Twin Cups, LLC

Liquid Vat Pasteurized Non-Dairy Protein System

Base Sorbet Mix Formula  Serving Size: 4 fl. oz./138g's delivers 16.56g's of protein  Batch Size: 500

| Order | Ingredients | Raw Ingred. Info | | | Formula Info | | Base Mix Info | | | | |
|---|---|---|---|---|---|---|---|---|---|---|---|
| | | % Fat | % Protein | % T.S. | % By Wt. | LB's/Batch | % Fat | % Protein | % T.S. | Gallons | % Sugar |
| 1 | Water | 0.00 | 0.00 | 0.00 | 60.130 | 300.65 | 0.000 | 0.000 | 0.000 | 36.01 | |
| 2 | Cane Sugar | 0.00 | 0.00 | 99.80 | 6.500 | 32.50 | 0.000 | 0.000 | 6.487 | | 6.44 |
| 2 | Xylitol | 0.00 | 0.00 | 99.00 | 14.000 | 70.00 | 0.000 | 0.000 | 13.860 | | |
| 2 | Trisodium Citrate | 0.00 | 0.00 | 98.00 | 0.100 | 0.50 | 0.000 | 0.000 | 0.098 | | |
| 2 | Deoiled Sunflower Lecithin | 80.00 | 1.00 | 95.00 | 0.100 | 0.50 | 0.080 | 0.001 | 0.095 | | |
| 2 | Sodium Tri-polyphosphate | 0.00 | 0.00 | 98.00 | 0.200 | 1.00 | 0.000 | 0.000 | 0.196 | | |
| 2 | Sodium Hexametaphosphate | 0.00 | 0.00 | 98.00 | 0.100 | 0.50 | 0.000 | 0.000 | 0.098 | | |
| 2 | Inulin | 0.00 | 0.00 | 90.00 | 3.850 | 19.25 | 0.000 | 0.000 | 3.465 | | 0.46 |
| 2 | Stevia Extract, 95% | 0.00 | 0.00 | 97.00 | 0.020 | 0.10 | 0.000 | 0.000 | 0.019 | | |
| 2 | Reb A | 0.00 | 0.00 | 94.50 | 15.000 | 75.00 | 0.000 | 0.000 | 14.175 | | 1.47 |
| 3 | Pea Protein | 0.50 | 80.00 | | | | 0.075 | 12.000 | | | |
| | Totals: | | | | 100.000 | 500.00 | 0.155 | 12.001 | 38.493 | | 8.37 |

Figure 3C

Dry Powder Dairy Protein Based Formulation - Concentrated Version

Mix Formula — Serving Size: 13.25 g's delivers 10.0 g's of protein — Batch Size: 500

| Order | Ingredients | Raw Ingred. Info | | Formula Info | | Base Mix Info | | |
|---|---|---|---|---|---|---|---|---|
| | | % Fat | % Protein | % T.S. | % By Wt. | LB's/Batch | % Fat | % Protein | % T.S. |
| | Cane Sugar | 0.00 | 0.00 | 99.80 | 0.000 | 0.00 | 0.000 | 0.000 | 0.000 |
| | Dextrose, Granulated | 0.00 | 0.00 | 99.00 | 0.000 | 0.00 | 0.000 | 0.000 | 0.000 |
| 2 | Trisodium Citrate | 0.00 | 0.00 | 98.00 | 0.355 | 1.78 | 0.000 | 0.000 | 0.348 |
| 2 | Deoiled Sunflower Lecithin | 80.00 | 1.00 | 95.00 | 0.355 | 1.78 | 0.284 | 0.004 | 0.337 |
| 2 | Sodium Tri-polyphosphate | 0.00 | 0.00 | 98.00 | 0.710 | 3.55 | 0.000 | 0.000 | 0.696 |
| 2 | Sodium Hexametaphosphate | 0.00 | 0.00 | 98.00 | 0.355 | 1.78 | 0.000 | 0.000 | 0.348 |
| | Inulin | 0.00 | 0.00 | 90.00 | 0.000 | 0.00 | 0.000 | 0.000 | 0.000 |
| | Stevia Extract, 97% Reb A | 0.00 | 0.00 | 97.00 | 0.000 | 0.00 | 0.000 | 0.000 | 0.000 |
| 1 | Skim Milk Powder | 0.65 | 36.00 | 96.00 | 7.670 | 38.35 | 0.050 | 2.761 | 7.363 |
| | Xylitol | 0.00 | 0.00 | 98.00 | 0.000 | 0.00 | 0.000 | 0.000 | 0.000 |
| 2 | Whey Protein Isolate | 0.3 | 94.00 | 95.30 | 1.776 | 8.88 | 0.005 | 1.669 | 1.693 |
| 3 | Whey Protein Concentrate | 7.00 | 80.00 | 95.50 | 88.779 | 443.90 | 6.215 | 71.023 | 84.784 |
| | Totals: | | | | 100.000 | 500.00 | 6.554 | 75.457 | 95.569 |

Figure 5A (c) 2015 Twin Cups, LLC

Dry Powder Dairy Protein Based Formulation with added xylitol

Mix Formula  Serving Size: 16.9 g's delivers 10.0 g's of protein  Batch Size: 992

| Order | Ingredients | Raw Ingred. Info % Fat | Raw Ingred. Info % Protein | Raw Ingred. Info % T.S. | Formula Info % By Wt. | Formula Info LB's/Batch | Base Mix Info % Fat | Base Mix Info % Protein | Base Mix Info % T.S. |
|---|---|---|---|---|---|---|---|---|---|
| 2 | Cane Sugar | 0.00 | 0.00 | 99.80 | 0.000 | 0.00 | 0.000 | 0.000 | 0.000 |
| 2 | Dextrose, Granulated | 0.00 | 0.00 | 99.00 | 0.000 | 0.00 | 0.000 | 0.000 | 0.000 |
| 2 | Trisodium Citrate | 0.00 | 0.00 | 98.00 | 0.278 | 0.00 | 0.000 | 0.000 | 0.272 |
| 2 | Deoiled Sunflower Lecithin | 80.00 | 1.00 | 95.00 | 0.278 | 0.00 | 0.222 | 0.003 | 0.264 |
| 2 | Sodium Tri-polyphosphate | 0.00 | 0.00 | 98.00 | 0.557 | 0.00 | 0.000 | 0.000 | 0.546 |
| 2 | Sodium Hexametaphosphate | 0.00 | 0.00 | 98.00 | 0.278 | 0.00 | 0.000 | 0.000 | 0.272 |
| 2 | Inulin | 0.00 | 0.00 | 90.00 | 0.000 | 0.00 | 0.000 | 0.000 | 0.000 |
| 2 | Stevia Extract, 97% Reb A | 0.00 | 0.00 | 97.00 | 0.000 | 0.00 | 0.000 | 0.000 | 0.000 |
| 6 | Skim Milk Powder | 0.65 | 36.00 | 96.00 | 6.015 | 0.00 | 0.039 | 2.165 | 5.774 |
| 2 | Xylitol | 0.00 | 0.00 | 98.00 | 21.582 | 0.00 | 0.000 | 0.000 | 21.150 |
| 4 | Whey Protein Isolate | 0.3 | 94.00 | 95.30 | 1.392 | 0.00 | 0.004 | 1.308 | 1.327 |
| 3 | Whey Protein Concentrate | 7.00 | 80.00 | 95.50 | 69.620 | 0.00 | 4.873 | 55.696 | 66.487 |
|  | Totals: |  |  |  | 100.000 | 0.00 | 5.139 | 59.173 | 96.093 |

Figure 5B

Dry Powder Protein Base Formulation with added xylitol, sugars, stevia and inulin Mix Formula     Serving Size: 21.3 g's delivers 10.0 g's of protein     Batch Size: 500

| | | Raw Ingred. Info | | | Formula Info | | Base Mix Info | | |
|---|---|---|---|---|---|---|---|---|---|
| Order | Ingredients | % Fat | % Protein | % T.S. | % By Wt. | LB's/Batch | % Fat | % Protein | % T.S. |
| 1 | Cane Sugar | 0.00 | 0.00 | 99.80 | 9.954 | 49.77 | 0.000 | 0.000 | 9.934 |
| 1 | Dextrose, Granulated | 0.00 | 0.00 | 99.00 | 4.424 | 22.12 | 0.000 | 0.000 | 4.380 |
| 2 | Trisodium Citrate | 0.00 | 0.00 | 98.00 | 0.221 | 1.11 | 0.000 | 0.000 | 0.217 |
| 2 | Deoiled Sunflower Lecithin | 80.00 | 1.00 | 95.00 | 0.221 | 1.11 | 0.177 | 0.002 | 0.210 |
| 2 | Sodium Tri-polyphosphate | 0.00 | 0.00 | 98.00 | 0.442 | 2.21 | 0.000 | 0.000 | 0.433 |
| 2 | Sodium Hexametaphosphate | 0.00 | 0.00 | 98.00 | 0.221 | 1.11 | 0.000 | 0.000 | 0.217 |
| 2 | Inulin | 0.00 | 0.00 | 90.00 | 6.150 | 30.75 | 0.000 | 0.000 | 5.535 |
| 2 | Stevia Extract, 97% Reb A | 0.00 | 0.00 | 97.00 | 0.040 | 0.20 | 0.000 | 0.000 | 0.039 |
| 3 | Skim Milk Powder | 0.65 | 36.00 | 96.00 | 4.778 | 23.89 | 0.031 | 1.720 | 4.587 |
| 1 | Xylitol | 0.00 | 0.00 | 98.00 | 17.143 | 85.72 | 0.000 | 0.000 | 16.800 |
| 3 | Whey Protein Isolate | 0.3 | 94.00 | 95.30 | 1.106 | 5.53 | 0.003 | 1.040 | 1.054 |
| 3 | Whey Protein Concentrate | 7.00 | 80.00 | 95.50 | 55.300 | 276.50 | 3.871 | 44.240 | 52.812 |
| | | | | Totals: | 100.000 | 500.00 | 4.082 | 47.002 | 96.216 |

Figure 5C (c) 2015 Twin Cups, LLC

Dry Powder Dairy Free Protein Based Formulation – Concentrated Version

Base Sorbet Mix Formula — Serving Size: 12.92g's delivers 10g's of protein — Batch Size: 500

| | | Raw Ingred. Info | | | Formula Info | | Base Mix Info | | |
|---|---|---|---|---|---|---|---|---|---|
| Order | Ingredients | % Fat | % Protein | % T.S. | % By Wt. | LB's/Batch | % Fat | % Protein | % T.S. |
| 2 | Cane Sugar | 0.00 | 0.00 | 99.80 | 0.000 | 0.00 | 0.000 | 0.000 | 0.000 |
| 2 | Xylitol | 0.00 | 0.00 | 99.00 | 0.000 | 0.00 | 0.000 | 0.000 | 0.000 |
| 2 | Trisodium Citrate | 0.00 | 0.00 | 98.00 | 0.645 | 3.23 | 0.000 | 0.000 | 0.632 |
| 2 | Deoiled Sunflower Lecithin | 80.00 | 1.00 | 95.00 | 0.645 | 3.23 | 0.516 | 0.006 | 0.613 |
| 2 | Sodium Tri-polyphosphate | 0.00 | 0.00 | 98.00 | 1.290 | 6.45 | 0.000 | 0.000 | 1.264 |
| 2 | Sodium Hexametaphosphate | 0.00 | 0.00 | 98.00 | 0.645 | 3.23 | 0.000 | 0.000 | 0.632 |
| 2 | Inulin | 0.00 | 0.00 | 90.00 | 0.000 | 0.00 | 0.000 | 0.000 | 0.000 |
| 2 | Stevia Extract, 95% Reb A | 0.00 | 0.00 | 97.00 | 0.000 | 0.00 | 0.000 | 0.000 | 0.000 |
| 3 | Pea Protein | 0.50 | 80.00 | 94.50 | 96.775 | 483.88 | 0.484 | 77.420 | 91.452 |
| | Totals: | | | | 100.000 | 500.00 | 1.000 | 77.426 | 94.594 |

Figure 6A (c) 2015 Twin Cups, LLC

Dry Powder Dairy Free Protein Based Formulation with added xylitol

Base Sorbet Mix Formula — Serving Size: 24.6g's delivers 10.0g's of protein — Batch Size: 500

| Order | Ingredients | Raw Ingred. Info % Fat | Raw Ingred. Info % Protein | Raw Ingred. Info % T.S. | Formula Info % By Wt. | Formula Info LB's/Batch | Base Mix Info % Fat | Base Mix Info % Protein | Base Mix Info % T.S. |
|---|---|---|---|---|---|---|---|---|---|
| 2 | Cane Sugar | 0.00 | 0.00 | 99.80 | 0.000 | 0.00 | 0.000 | 0.000 | 0.000 |
| 2 | Xylitol | 0.00 | 0.00 | 99.00 | 47.458 | 237.29 | 0.000 | 0.000 | 46.983 |
| 2 | Trisodium Citrate | 0.00 | 0.00 | 98.00 | 0.339 | 1.70 | 0.000 | 0.000 | 0.332 |
| 2 | Deoiled Sunflower Lecithin | 80.00 | 1.00 | 95.00 | 0.339 | 1.70 | 0.271 | 0.003 | 0.322 |
| 2 | Sodium Tri-polyphosphate | 0.00 | 0.00 | 98.00 | 0.678 | 3.39 | 0.000 | 0.000 | 0.664 |
| 2 | Sodium Hexametaphosphate | 0.00 | 0.00 | 98.00 | 0.339 | 1.70 | 0.000 | 0.000 | 0.332 |
| 2 | Inulin | 0.00 | 0.00 | 90.00 | 0.000 | 0.00 | 0.000 | 0.000 | 0.000 |
| 2 | Stevia Extract, 95% Reb A | 0.00 | 0.00 | 97.00 | 0.000 | 0.00 | 0.000 | 0.000 | 0.000 |
| 3 | Pea Protein | 0.50 | 80.00 | 94.50 | 50.847 | 254.24 | 0.254 | 40.678 | 48.050 |
| | Totals: | | | | 100.000 | 500.00 | 0.525 | 40.681 | 96.685 |

Figure 6B

Dry Powder Dairy Free Protein Based Formulation with added xylitol, sugars, stevia and inulin Base Sorbet Mix Formula  Serving Size: 33.22g's delivers 10.0g's of protein    Batch Size: 500

| Order | Ingredients | Raw Ingred. Info | | | Formula Info | | Base Mix Info | | |
|---|---|---|---|---|---|---|---|---|---|
| | | % Fat | % Protein | % T.S. | % By Wt. | LB's/Batch | % Fat | % Protein | % T.S. |
| 2 | Cane Sugar | 0.00 | 0.00 | 99.80 | 16.303 | 81.52 | 0.000 | 0.000 | 16.270 |
| 2 | Xylitol | 0.00 | 0.00 | 99.00 | 35.114 | 175.57 | 0.000 | 0.000 | 34.763 |
| 2 | Trisodium Citrate | 0.00 | 0.00 | 98.00 | 0.251 | 1.26 | 0.000 | 0.000 | 0.246 |
| 2 | Deoiled Sunflower Lecithin | 80.00 | 1.00 | 95.00 | 0.251 | 1.26 | 0.201 | 0.003 | 0.238 |
| 2 | Sodium Tri-polyphosphate | 0.00 | 0.00 | 98.00 | 0.502 | 2.51 | 0.000 | 0.000 | 0.492 |
| 2 | Sodium Hexametaphosphate | 0.00 | 0.00 | 98.00 | 0.251 | 1.26 | 0.000 | 0.000 | 0.246 |
| 2 | Inulin | 0.00 | 0.00 | 90.00 | 9.656 | 48.28 | 0.000 | 0.000 | 8.690 |
| 2 | Stevia Extract, 95% Reb A | 0.00 | 0.00 | 97.00 | 0.050 | 0.25 | 0.000 | 0.000 | 0.049 |
| 3 | Pea Protein | 0.50 | 80.00 | 94.50 | 37.622 | 188.11 | 0.188 | 30.098 | 35.553 |
| | Totals: | | | | 100.000 | 500.00 | 0.389 | 30.100 | 96.547 |

Figure 6C

Liquid Ingredient Addition Chart

G's of Liquid Ingredient Mix Needed per Serving to Provide the Following Levels of Protein

| Ingredient Description | 2 G'S | 4 G'S | 6 G'S | 8 G'S | 10 G'S | 15 G'S |
|---|---|---|---|---|---|---|
| Vat Pasteurized Dairy System | 9.41 | 18.82 | 28.24 | 37.65 | 47.06 | 70.59 |
| HTST Pasteurized Dairy System | 10.26 | 20.51 | 31.50 | 41.03 | 51.28 | 76.92 |
| UHT Pasteurized Dairy System | 13.33 | 25.67 | 40.00 | 53.33 | 66.67 | 100.00 |
| Vat Pasteurized Non-Dairy System | 16.67 | 33.33 | 50.00 | 66.67 | 83.33 | 125.00 |
| HTST Pasteurized Non Dairy System | 20.00 | 40.00 | 60.00 | 80.00 | 100.00 | 150.00 |
| UHT Pasteurized Non Dairy System | 22.22 | 44.44 | 66.67 | 88.89 | 111.11 | 166.67 |

Figure 7

Dry Ingredient Addition Chart

G's of Dry Ingredient Mix Needed per Serving to Provide the Following Levels of Protein

| Ingredient Description | 2 G'S | 4 G'S | 6 G'S | 8 G'S | 10 G'S | 15 G'S |
|---|---|---|---|---|---|---|
| Concentrated Dairy System | 2.65 | 5.30 | 7.95 | 10.60 | 13.25 | 19.88 |
| Dairy System with Xylitol | 3.38 | 6.76 | 10.14 | 13.52 | 16.90 | 25.35 |
| Dairy System with Xylitol/Sugars/Inulin | 4.26 | 8.51 | 12.77 | 17.02 | 21.28 | 31.92 |
| Concentrated Non-Dairy System | 2.58 | 5.17 | 7.75 | 10.33 | 12.92 | 19.37 |
| Non-Dairy System with Xylitol | 4.92 | 9.83 | 14.75 | 19.67 | 24.58 | 36.87 |
| NOn-Dairy System with Xylitol/Sugars/In | 6.65 | 13.29 | 19.93 | 26.58 | 33.22 | 49.83 |

Figure 8

(c) 2015 Twin Cups, LLC

HIGH-PROTEIN FOOD ADDITIVES

RELATED APPLICATION INFORMATION

This application is a division of U.S. patent application Ser. No. 14/986,208, filed Dec. 31, 2015, now U.S. Pat. No. 9,675,100, which claims the benefit of priority under 35 U.S.C. § 119 from Provisional Application No. 62/201,701, filed Aug. 6, 2015.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

FIELD

Unflavored dairy and non-dairy (dairy free) based high protein ingredient systems (additive) in liquid or dry powder form which can be added into a wide array of flavored products to enhance their protein and nutritional levels.

BACKGROUND

The recent popularity and market demand of high-protein foods have encouraged many companies to develop and launch a wide range of products to address this consumer need. When developing dairy-based dessert products, however, formulators encounter rheological and textural limitations during processing that have restricted them from reaching protein levels above 15%. Most attempts fail due to the nature of dairy and non-dairy proteins to gel or precipitate when used at high levels in liquid based or dry products such as ready to eat desserts or beverages, especially under the high heat conditions associated with the required pasteurization step. In the case of dairy proteins that display resistance to thermal gelling or precipitation, the typical result is a product that sets up like silly putty in a gelled matrix or precipitates and forms an unpleasant sandy or gritty texture. Non-dairy proteins often suffer the same results when likewise processed. In these cases, the products receive poor consumer acceptance and are usually abandoned before they reach the marketplace.

There is thus a need for high-protein food additive to be combined with various food products that has a smooth and rich texture for a pleasant mouth feel.

SUMMARY OF THE DISCLOSURE

The present application describes an unflavored dairy and non-dairy (dairy free) based high protein ingredient system (additive) that is available in either a liquid or dry powder blend. These ingredient system options have been balanced to provide a rich and creamy mouthfeel which can be easily added into a wide array of flavored products to enhance their protein and nutritional levels without creating the sandy or gritty texture that typically forms.

The liquid version has already been pasteurized or asceptically packaged for easy incorporation into other liquid products such as smoothies, yogurts, puddings, jells, toppings, fillings, carbonated or still beverages, ice cream mixes, frozen yogurts and frozen desserts. The powdered version is designed to be easily blended into other dry mixes, batters, dressings, hummus products, breads, and dry dessert mixes. The asceptically packaged liquid versions provide 12 months of shelf life at or below 75° F., high-temperature short-time (HTST) liquid versions offers 18 months of shelf life at or below 0° F., while the powdered versions offer 24 months of shelf life at or below 75° F.

These additives are unflavored and have a clean taste that often complements the flavor of the products they are mixed with while also providing a rich and creamy body. The proteins used in the examples below come from either grade A milk sources (dairy) or milk of pea sources (non-dairy), and both have a high PER (Protein Efficiency Ratio) value for optimal nutritional enhancement. The additives have a naturally high calcium level and relatively low sugar levels. The liquid version is easily incorporated into other liquid products such as water, milk products such as liquid milk, smoothies, yogurts, puddings, jells, toppings, fillings, carbonated or still beverages such as juices of milks, ice cream mixes, frozen yogurts and frozen desserts. The powdered version is designed to be easily blended into other dry mixes, batters, baked goods, cereals, dressings, hummus products, breads, and dry dessert mixes.

The disclosed additives can be used as an ingredient to achieve a 20 g per 4 oz serving boost of protein to any format without having to add additional sugars or stabilizers that are not natural. This not only allows for a clean and good tasting product, but gets manufactures past production issues with adding high levels of proteins into their process without breaking down or compromising their finished products.

BRIEF DESCRIPTION OF THE DRAWINGS

FIGS. 2A-2C are tables listing preferred ingredients and their properties for forming an exemplary high-protein dairy liquid food additive using the process shown in FIG. 1;

FIGS. 3A-3C are tables listing preferred ingredients and their properties for forming an exemplary high-protein non-dairy liquid food additive using the process shown in FIG. 1;

FIGS. 5A-5C are tables listing preferred ingredients and their properties for forming an exemplary high-protein dairy dry food additive using the process shown in FIG. 4;

FIGS. 6A-6C are tables listing preferred ingredients and their properties for forming an exemplary high-protein non-dairy dry food additive using the process shown in FIG. 4;

FIG. 7 is a chart showing amounts needed for the various liquid additive formulations to attain particular protein levels; and FIG. 8 is a chart showing amounts needed for the various dry additive formulations to attain particular protein levels.

DETAILED DESCRIPTION

The present application discloses methods for preparing neutral flavored (or unflavored) high protein (>15%) ingredient systems or additives to be combined with ready to eat food products, including frozen yogurts, that provide a rich and creamy texture with high consumer appeal. The methods described herein are particularly effective in incorporating dairy and non-dairy proteins into such food products without resulting in a gritty or silty texture. For example, non-dairy proteins derived from canola, soy, bean, pea, and even hemp may be used in the food additives described herein.

The term "unflavored" or neutral flavored refers to a characteristic of the disclosed additives which permits them to be added to various "base" components which provide the primary flavor to the resulting product. As such, unflavored does not mean that there is no flavor whatsoever, just that the flavor of the additive does not predominate in the final product. For instance, dairy-based additives may include ingredients such as milk, which has a flavor albeit mild, and various sweeteners may be included in the additive which imparts sweetness. Furthermore, an "unflavored" additive as described herein may be added to a relatively mildly flavored base component having a similar taste, such as an additive for plain or vanilla yogurt. Consequently, the term "unflavored" refers to the property that the additive may be combined with numerous differently-flavored base components without substantively changing the taste of the final product. That is, the base component provides the final flavor, not the additive.

In the formula examples provided below, the protein content of the liquid versions vary based on the type of protein and on the method of pasteurization used due to process limitations associated with the different proteins and the different temperatures used in each process. For example, whey protein mixtures tend to be lower in viscosity and more heat stable than pea protein mixtures. The different pasteurization processes include vat pasteurization at temperatures of 155-165° F. high-temperature short-time (HTST) pasteurization at temperatures of 175-185° F., and ultra-high temperature (UHT) pasteurization at temperatures of 275-285° F.

Figure 1:
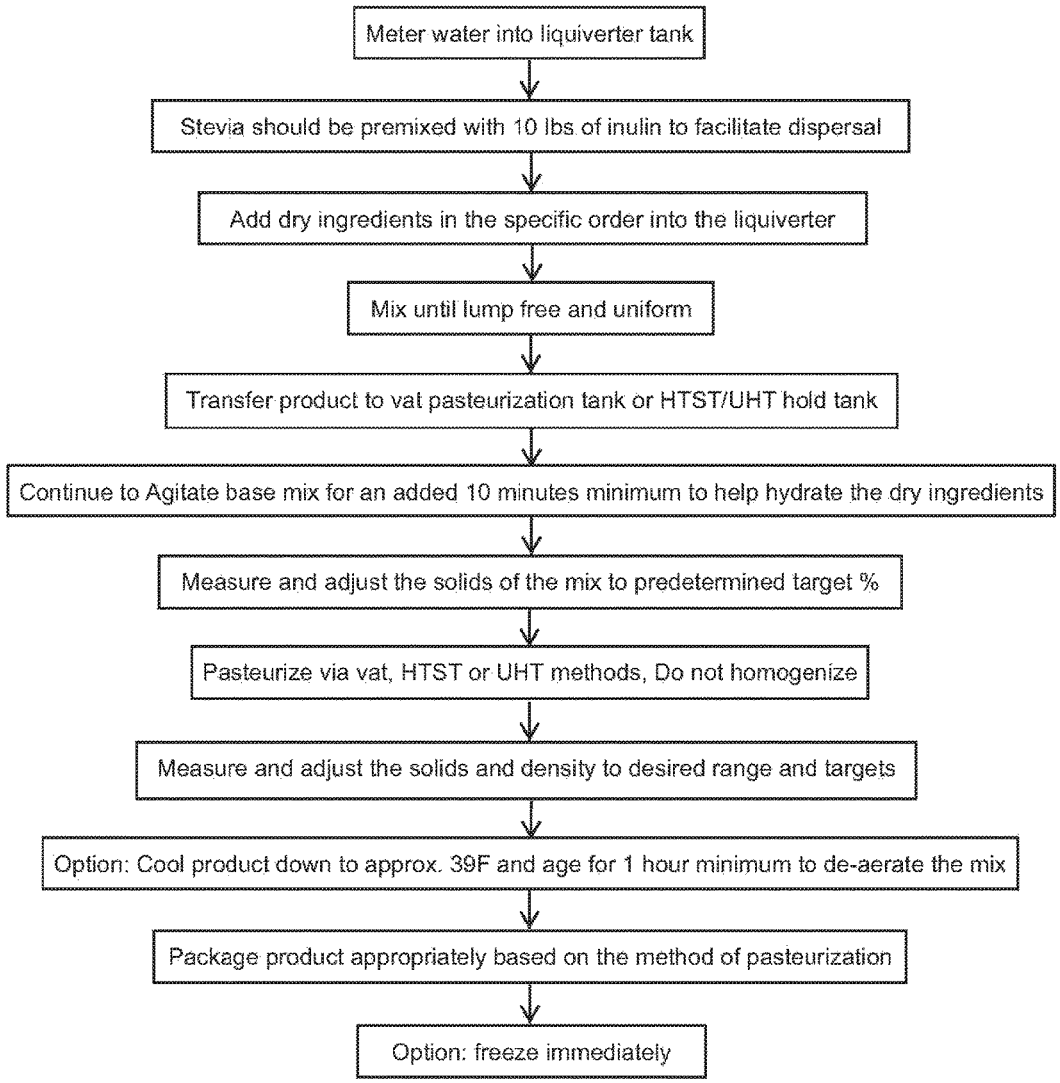
FIG. 1 is a flowchart of an exemplary process for producing a high-protein liquid food additive of the present application.

FIG. 1 is a flowchart of an exemplary process for producing a high-protein liquid food additive of the present application. Depending on the particular mix used, as detailed in FIGS. 2A-2C for dairy additives and 3A-3C for non-dairy additives, the mix will be transferred into different tanks (vat, HTST, or UHT) and pasteurized accordingly.

First, water is metered into a high shear liquiverter. High shear mixing conditions may be created using numerous commercial mixing systems, for example, Likwifier, Liquiverter, etc. After mixing until lump free, the contents of the liquiverter are transferred to a vat, or holding tank. After further agitation for about 10 minutes, the solids of the mix are measured and adjusted to a predetermined target percent. Solid levels are typically adjusted by adding water, and consequently a high solid level is generally the initial target to enable adjustment. Then the mix is pasteurized via a vat, HTST, or UHT process. The dairy version should not be homogenized, however, the non-dairy versions can be homogenized. Once again, the solids content of the mix are measured via a microwave based moisture analyzer or a NIR based analyzer and adjusted to a desired target. Optionally the mix is cooled down to about 39° F. and aged for at least an hour to de-aerate. At this point the product is complete and is packaged and typically flash frozen.

FIGS. 2A-2C are tables listing preferred ingredients and their properties for forming an exemplary high-protein dairy liquid food additive using the process shown in FIG. 1. The dairy protein used is primarily whey protein concentrate with some whey protein isolate and skim milk powder.

For the formulation of FIG. 2A, the following parameters are desirable: solids range: 38.5+/−1.0%; Density target: 9.7 lbs/gallon, and Density range: 137.5 g's+/−1.0 g's/4 fl. oz. The formula requires 100.0 g's to deliver 15 g's protein, and a 4 fl. oz. (118.28 ml) serving of unaerated mix (137.5 g's) delivers 20.6 g's protein.

For the formulation of FIG. 2B, the following parameters are desirable: solids range: 42.0+/−1.0%; Density target: 9.87 lbs/gallon, and Density range: 139.9 g's+/−1.0 g's/4 fl. oz. The formula requires 77 g's to deliver 15 g's protein, and a 4 fl. oz. serving of unaerated mix (139.9 g's) delivers 27.28 g's protein.

For the formulation of FIG. 2C, the following parameters are desirable: solids range: 43.5+/−1.0%; Density target: 9.92 lbs/gallon, and Density range: 140.6 g's+/−1.0 g's/4 fl. oz. The formula requires 70.6 g's to deliver 15 g's protein, and a 4 fl. oz. serving of unaerated mix (140.6 g's) delivers 29.87 g's protein.

Therefore, for the liquid dairy protein formulations, the proposed formulas require between about 70-100 g's to deliver 15 g's protein.

FIGS. 3A-3C are tables listing preferred ingredients and their properties for forming an exemplary high-protein non-dairy liquid food additive using the process shown in FIG. 1. The non-dairy protein used derives from peas, though again various non-dairy proteins could be substituted.

For the formulation of FIG. 3A, the following parameters are desirable: solids range: 35.1+/−1.0%; Density target: 9.6 lbs/gallon, and Density range: 136.1 g's+/−1.0 g's/4 fl. oz. A 4 fl. oz. serving of unaerated mix (136.1 g's) delivers 12.25 g's protein, which equates to 166.7 g's to deliver 15 g's protein.

For the formulation of FIG. 3B, the following parameters are desirable: solids 36.3+/−1.0%; Density target: 9.65 lbs/gallon, and Density range: 136.79 g's+/−1.0 g's/4 fl. oz. A 4 fl. oz. serving of unaerated mix (136.8 g's) delivers 13.7 g's protein, which equates to 149.8 g's to deliver 15 g's protein.

For the formulation of FIG. 3C, the following parameters are desirable: solids range: 38.5+/−1.0%; Density target: 9.74 lbs/gallon, and Density range: 138 g's+/−1.0 g's/4 fl. oz. A 4 fl. oz. serving of unaerated mix (138 g's) delivers 16.5 g's protein, which equates to 125.5 g's to deliver 15 g's protein.

Therefore, for the liquid non-dairy protein formulations, the proposed formulas require between about 120-170 g's to deliver 15 g's protein.

Figure 4:
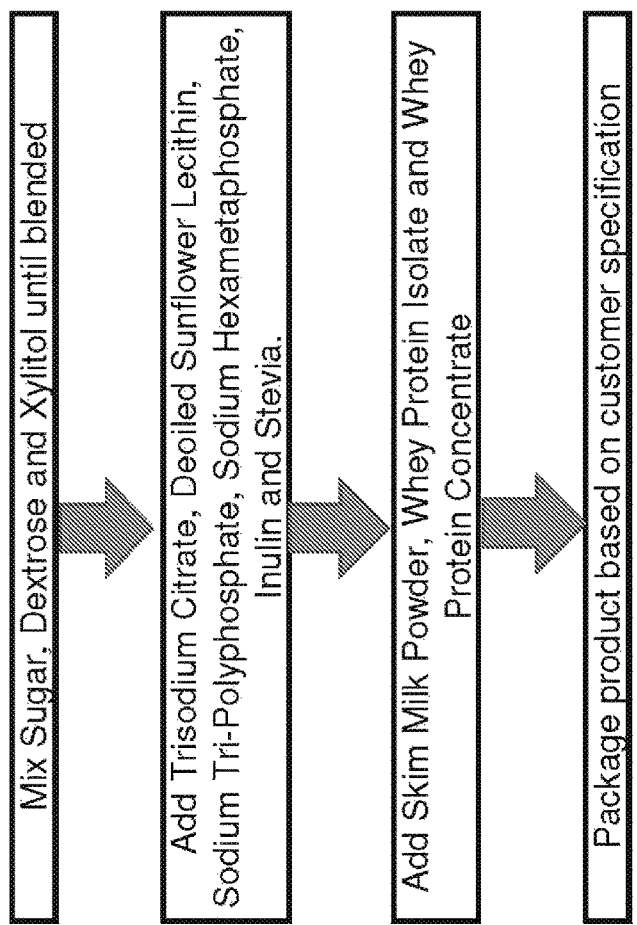
FIG. 4 is a flowchart illustrating the general formulation steps for producing a batch of the dry powder high protein base in accordance with the present application.

FIG. 4 is a flowchart illustrating the general formulation steps for producing a batch of the dry powder high protein additive in accordance with the present application. First, sweeteners such as sugar, dextrose and Xylitol are mixed until well blended for good dispersion. Various other ingredients such as trisodium citrate and lecithin are then added to the sweet mix, after which the proteins such as whey protein and skim milk in dry form are added. The product is then complete and is packaged according to customer needs. No freezing is needed with the dry additive.

FIGS. 5A-5C are tables listing preferred ingredients and their properties for forming an exemplary high-protein dairy dry food additive using the process shown in FIG. 4. Again, the dairy protein used is primarily whey protein concentrate with some whey protein isolate and skim milk powder.

For the formulation of FIG. 5A, the formula requires about 13.25 g's to deliver 10 g's protein.

For the formulation of FIG. 5B, the formula requires about 16.9 g's to deliver 10 g's protein.

For the formulation of FIG. 5C, the formula requires about 21.3 g's to deliver 10 g's protein.

Therefore, for the dry dairy protein formulations, the proposed formulas require between about 13-22 g's to deliver 10 g's protein.

FIGS. 6A-6C are tables listing preferred ingredients and their properties for forming an exemplary high-protein non-dairy dry food additive using the process shown in FIG. 4. As before, the non-dairy protein used derives from peas, though various other non-dairy proteins could be substituted.

For the formulation of FIG. 6A, the formula requires about 12.92 g's to deliver 10 g's protein.

For the formulation of FIG. 6B, the formula requires about 24.6 g's to deliver 10 g's protein.

For the formulation of FIG. 6C, the formula requires about 33.2 g's to deliver 10 g's protein.

Therefore, for the dry non-dairy protein formulations, the proposed formulas require between about 13-35 g's to deliver 10 g's protein.

When it comes to processing, low vat pasteurization temperatures of 155-165° F. enable the addition of the highest level of protein. The moderate high-temperature short-time (HTST) pasteurization temperatures of 175-185° F., results in a slight reduction while the ultra-high temperature (UHT) pasteurization temperatures of 275-285° F. reduces the level of protein even further. In the dry examples, the protein levels also vary based on the type of protein. With the dry additives, the protein levels also vary due to changes in the added levels of diluents such as xylitol, sugar or inulin. The addition of these diluents provide for easier dispersion, increased sweetness, and sometimes increased fiber.

Because of the variations in protein levels between the different systems, a number of Ingredient Addition Charts were created to help determine the amount of each ingredient system needed to provide a specific level of added protein desired. The gram additions for each system are based on the amounts needed per serving to provide the indicated grams of protein.

Ultimately, the additives described herein may be supplied to the final food product manufacturer with instructions on mixing the liquid or dry additives with liquid or dry flavored base component to form a food product. The instructions may be similar to the proportions given in the charts of FIGS. 7 and 8. The food product will primarily have the flavor of the base component, and have an enhanced protein level above that of the base component.

FIG. 7 is a chart showing amounts needed per serving for the various liquid additive formulations to attain particular protein levels. For example, to add 2 g's of protein per serving to a desired flavored liquid product such as yogurt, 9.41 g's of the liquid dairy additive that has been Vat pasteurized is needed. So, if the final yogurt product has a mass of 30 g's, then 9.41 g's of such an additive is combined with 20.59 g's of a flavored base component liquid product. Of course, depending on the flavor desired and the relative proportions of the additive and base component, the flavor concentration of the base component liquid product will be enhanced to accommodate the unflavored liquid dairy additive. To add 15 g's protein per serving to a yogurt base component, 70.59 g's of the liquid dairy additive that has been Vat pasteurized is needed. In that case, the final yogurt product may have a mass of 300 g's, and 70.59 g's of the additive is combined with 229.41 g's of the flavored yogurt base component.

To further clarify using the last example, it should be understood that the addition of 70.6 g's of the vat pasteurized formula will add an additional 15 g's of protein over and above the level already found in the product it is blended with. In the example used, 300 g's is larger than a typical serving size. More typically, a total serving size may be 150 g's in which 70.6 g's of the vat pasteurized additive is blended with 79.4 g's of a customer's base component which contains 5 g's of protein bringing the total to 20 g's of protein.

As mentioned, the different pasteurization processes affect the final protein level of the additives, with low vat pasteurization providing the highest level of protein, high-temperature short-time (HTST) pasteurization less so, and ultra-high temperature (UHT) pasteurization reduces the level of protein even further. The chart of FIG. 7 illustrates the declining protein levels and concomitantly higher amount of additive needed for a particular protein boost for these pasteurization processes.

FIG. 8 is a chart showing amounts needed for the various dry additive formulations to attain particular protein levels. For example, to add 2 g's of protein per serving to a desired flavored dry product such as a bread mix, 2.65 g's of the concentrated dry dairy additive is needed. So, if the final bread mix product has a mass of 30 g's, then 2.65 g's of such an additive is combined with 27.35 g's of a base component dry product. Here again the amounts must be based on serving size. So, for instance, if the serving size of the bread mix is 30 g's and the idea is to target 3 g's of protein/serving but the starting level of a customer's mix is only 1.1 g of protein, then an additional 2.65 g's of the selected dry mix may be added to 27.35 g's of an existing flavored base component to achieve the desired 3 g's of protein.

The powdered version is designed to be easily blended into other dry mixes, batters, dressings, hummus products, breads, and dry dessert mixes.

The disclosed methods help offset the detrimental effects of using hard water in high protein mixes. Often, manufacturing plants do not use soft water and the mixes and added minerals disclosed herein are able to compensate for hard water conditions.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

What is claimed is:

1. A process of preparing a dairy or a non-dairy based dry food product, comprising:
   mixing sweeteners selected from the group consisting of sugar, dextrose and xylitol until well blended for good dispersion to form a sweet mix;
   adding dry ingredients to the sweet mix, the dry ingredients including stevia and inulin and at least tri-sodium citrate, lecithin, sodium tri-polyphosphate, and sodium hexametaphosphate to form a dry mix;
   adding a protein ingredient selected from the group consisting of skim milk powder, whey protein isolate, whey protein concentrate, canola protein, soy protein, bean protein, pea protein and hemp protein to the dry mix to form a dry additive;
   packaging the dry additive; and providing instructions along with the packaged dry additive on mixing the dry additive with a dry flavored base component to form a dry food product primarily having the flavor of the base component and having a protein level above that of the base component.

2. The method of claim 1, wherein the dry additive is unflavored relative to the base component.

3. The method of claim 1, wherein the dry additive has a flavor similar to the base component.

4. The method of claim 1, wherein the base component has a protein level of less than 15% and the food product has a protein level of greater than 15%.

5. The method of claim 1, wherein the dry food product is selected from the group consisting of batters, dressings, hummus products, breads, and dry dessert mixes.

6. The method of claim 1, wherein the dry food product is dairy-based and the protein ingredient includes skim milk powder, whey protein isolate and whey protein concentrate.

7. The method of claim 1, wherein the dry food product is non-dairy-based and the protein ingredient includes pea protein.

8. The method of claim 1, wherein the dry food product is non-dairy-based and the protein ingredient is selected from the group consisting of canola, soy, bean, and hemp proteins.

\* \* \* \* \*